J. ALLEND.
VEHICLE TIRE.
APPLICATION FILED APR. 2, 1919.

1,343,540.

Patented June 15, 1920.

INVENTOR:
Joseph Allend
BY
ATTORNEY.

UNITED STATES PATENT OFFICE.

JOSEPH ALLEND, OF PHILADELPHIA, PENNSYLVANIA.

VEHICLE-TIRE.

1,343,540.　　　　　Specification of Letters Patent.　　Patented June 15, 1920.

Application filed April 2, 1919. Serial No. 287,003.

*To all whom it may concern:*

Be it known that I, JOSEPH ALLEND, a citizen of the United States, residing at Philadelphia, in the county of Philadelphia and State of Pennsylvania, have invented certain new and useful Improvements in Vehicle-Tires, of which the following is a specification.

My invention relates to improvements in vehicle tires.

The object of the invention is to provide a tire in which a spiral spring is contained within an outer casing or shoe in substitution for the usual inner tube of the well known pneumatic tire in combination with a novel, simple and efficient means to clamp the shoe and the spiral spring together and to clamp them to the wheel rim in a manner to prevent creeping or relative displacement between the parts forming the tire.

With the above and related objects in view, my invention consists in the novel construction and combinations of parts hereinafter described and claimed.

In the accompanying drawings illustrating my invention,

Figure 1 a side view of a vehicle wheel provided with a tire embodying my invention, partly broken away.

Figure 1:
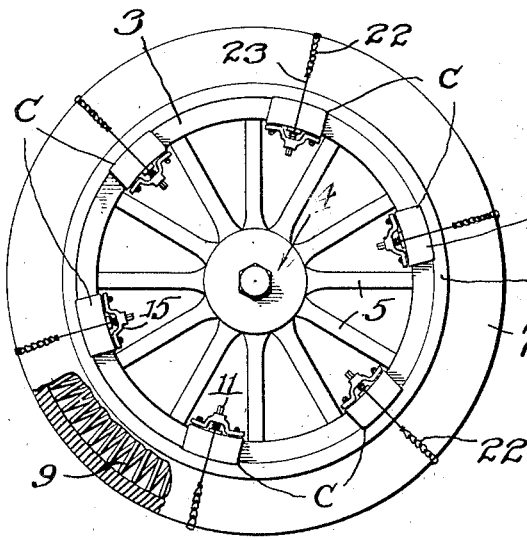
Figure 2:
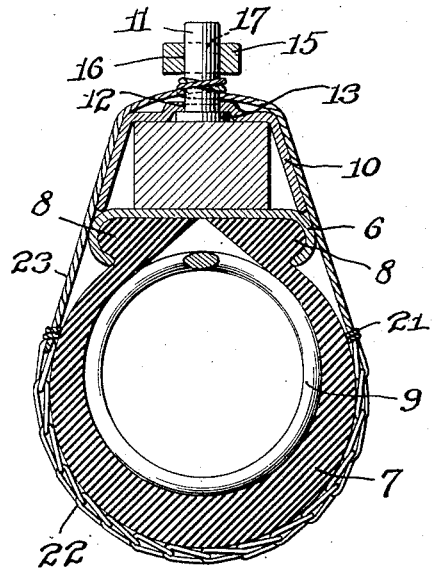
Fig. 2 is a transverse section through the tire and the wheel rim on line 2—2 of Fig. 2.
Figure 3:
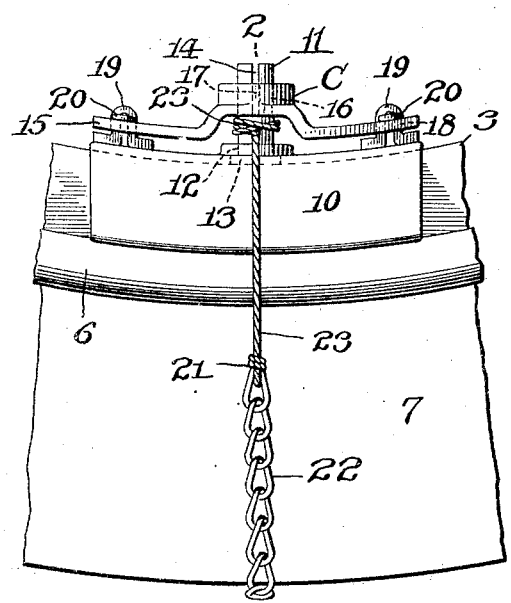
Fig. 3 is a side view of a portion of the tire and the wheel rim and one of the clamping devices.
Figure 4:
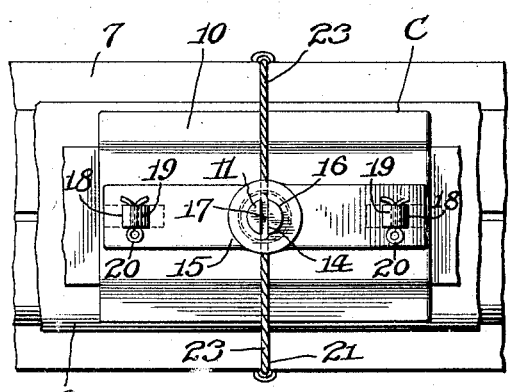
Fig. 4 is a top view of the parts shown in Fig. 3.

Referring to the drawings, 3 designates a vehicle wheel, comprising the hub 4, spokes 5 and rim 6. The rim 6 is of the usual clencher type and may be mounted on the wood felly to which the spokes 5 are connected. Mounted on the rim 6 is a shoe 7, composed of rubber and fabric and having annular ribs 8 which are seated in the grooves of the clencher rim 6.

The parts thus far described are the same as the parts of the well known pneumatic tire and its mounting, the shoe 7 being the usual shoe or casing which incloses the inner tube of the pneumatic tire.

Located within the shoe or casing 7 in the same position usually occupied by the inner tube of a pneumatic tire is a spiral spring 9 which extends entirely around the tire and holds the shoe 7 in the distended position shown in the drawings.

Located at intervals around the tire and surrounding the shoe 7 and rim 6 are clamping devices C, any desired number of which may be employed. These clamping devices C are alike in construction, and therefore the following description of one will suffice for all. Seated on the rim 6 is a block 10 which carries a rotatable member 11. This part 11, as herein shown, is in the form of a bolt which extends through and is adapted to turn in an opening 12 in the block 10 and which is provided with a head 13 arranged within a depression in the block 10 between the body of the block and the felly to prevent the bolt or part 11 from being withdrawn from the block. The bolt 11 is provided with a longitudinal slot 14 for purposes hereinafter explained.

Mounted on the bolt 11 is a bar 15 having a central opening 16 therein through which the bolt 11 extends. The bar 15 has a crosspiece 17 which extends through the slot 14 to cause the bolt 11 to turn when the bar 15 is turned about the axis of the bolt and to permit the bar 15 to move longitudinally of the bolt toward and from the block 10.

The end portions of the bar 15 are provided with openings 18 which are adapted to receive brackets or projections 19 formed on or secured to the block 10 when the bar 15 is moved toward the body of the block. The purpose of the projections 19 is to prevent the turning of the bar 15 and therewith the bolt 11; and, after the bar 15 has been moved toward the block 10 to cause the projections 19 to extend through and beyond the openings 18, cotter pins 20 are inserted into openings in the projections 19 to prevent the withdrawal of the bar 15 therefrom.

Embracing the shoe 7 and the spring 9 therein is a flexible clamping member 21 having end portions which extend through the slot 14 in the bolt 11 and which are wound around the bolt 11 for the purpose of securing the member 21 in place. The central portion of the member 21 is preferably formed of an anti-skid chain 22 and the end portions 23 thereof are preferably formed of twisted wire cable, the end portions 23 being suitably connected to the anti-skid chain portion 22.

In assembling the parts, the spring 9 is placed within the shoe 7 and the shoe 7 is applied to the clencher rim 6 in the usual well known manner. This being done, the clamping devices C are applied, each device being applied as follows: The bolt 11 is first inserted into the opening 12 in the block 10, and the block 10 is then seated upon the rim 6. The member 21 is then placed around the shoe 7 and the end members 23 thereof are passed into the slot 14 of the bolt 11. The bar 15 is then applied to the bolt 11 with the portion 17 thereof extending through the slot 14. The bar 15 is then turned by hand around the axis of the bolt 11, causing the bar 15 to act as a lever and turn the bolt 11 in a manner to wind the end portions 23 of the member 21 around the bolt and thereby cause the member 21 to firmly grip the shoe 7 and spring 9 therein and clamp the same together and to the wheel rim 6. After the member 21 has been thus tightened to effect the clamping operation, the bar 15 is moved on the bolt 11 toward the block 10 until the projections 19 extend through and beyond the openings 18 in the bar 15. The cotter pins 20 are then inserted into the projections 19 to lock the bar 15 in place.

It will be understood that when the clamping devices C have all been applied, the shoe 7, spring 9 and rim 6 will be firmly clamped together at intervals around the tire in a manner to prevent them from creeping or being displaced relatively to each other. This not only prevents the parts from wearing, but confines the cushioning action of different parts of the spring to limited areas when the tire is in service.

The tire herein described provides an acceptable substitute for the well known pneumatic tire and provides a tire which will hold the shoe 7 in the desired distended position in a manner to yield and give the proper resiliency when in service.

I claim:—

1. The combination of a wheel rim, a tire shoe thereon, a spiral spring within the shoe, and means surrounding the shoe and the spring therein and clamping them together.

2. The combination of a wheel rim, a tire thereon, and means to secure the tire to the rim comprising a block seated against said rim, a part rotatable on the block, a flexible member embracing the tire and the rim and having end portions connected to said part, whereby when said part is turned said tire and rim will be clamped together, and means to secure said part to the block.

3. The combination of a wheel rim, a tire thereon, and means to secure the tire to the rim comprising a block seated against said rim, a part rotatable on the block and having a slot therein, a flexible member embracing the tire and the rim and having end portions extending into the slot in said part, whereby when said part is turned the end portions of the member will be wound around the same and said tire and rim will be thereby clamped together, and means to secure said part to the block.

4. The combination of a wheel rim, a tire thereon, and means to secure the tire to the rim comprising a block seated against said rim, a part rotatable on the block and having a slot therein, a bar mounted on said part and having a portion extending into said slot and locking said part and the bar together causing the part to turn with the bar, a flexible member embracing the tire and the rim and having end portions connected to said part, whereby when said part is turned said tire and rim will be clamped together, and means to secure the bar to the block.

5. The combination of a wheel rim, a tire thereon, and means to secure the tire to the rim comprising a block seated against said rim, a part rotatable on the block, a bar connected to said part and operative to turn the same, a flexible member embracing the tire and the rim and having end portions connected to said part, whereby when said part is turned said tire and rim will be clamped together, and means to secure the bar to the block.

6. The combination of a wheel rim, a tire thereon, and means to secure the tire to the rim comprising a block seated against said rim and having a projection provided with an opening, a part rotatable on the block, a flexible member embracing the tire and the rim and having end portions connected to said part, whereby when said part is turned said tire and rim will be clamped together, a bar connected to said part and operative to turn the same and having an opening therein to receive said projection, and a cotter pin inserted into the opening in the projection to lock the bar thereto.

7. The combination of a wheel rim, a tire thereon, and means to secure the tire to the rim comprising a block seated against said rim, a part rotatable on the block, a flexible member embracing the tire and the rim and having end portions connected to said part, whereby when said part is turned said tire and rim will be clamped together, said member having a chain of links forming the central portion thereof and flexible parts, narrower than the chain of links, forming the end portions thereof, and means to secure said part to the block.

In testimony whereof I affix my signature hereto.

JOSEPH ALLEND.